Patented May 3, 1949

2,468,940

UNITED STATES PATENT OFFICE 2,468,940

PRINTING CELLULOSE ESTER MATERIAL WITH ACID AND DIRECT DYES

Charles Franklin Miller, Delaware County, Pa., assignor to E. I. du Pont de Nemours & Company, Wilmington, Del., a corporation of Delaware No Drawing. Application July 26, 1947, Serial No. 764,031

5 Claims. (Cl. 8—63)

This invention relates to an improved process and composition for printing cellulose esters with direct and acid colors.

It is an object of this invention to provide an improved composition for printing cellulose ester fabric with dyestuffs of the aforementioned classes, whereby to secure improved strength and brilliance, improved penetration, and other valuable advantages as more fully set forth hereinbelow.

It is old in the art to print cellulose ester material, for instance cellulose acetate, by the aid of special assistants such as ammonium or zinc thiocyanate, urea, thiourea, sulfo-ricinoleic acid, phenol, sodium p-toluene-sulfonate, and various combinations of these and other reagents. Nevertheless, all these processes suffer from specific objectionable features; for instance alkali-metal, alkaline earth and ammonium thiocyanates tend to precipitate many acid and direct colors in the thickener; phenols and zinc chloride or nitrate tender the fiber excessively; urea and other heretofore disclosed hydrotropic agents lack sufficient solvent power to give the maximum strength, brilliance and penetration with many acid and direct colors, particularly the blacks.

Now I find that particularly valuable results, free from the above enumerated objections and accompanied by many additional advantages are obtained if one prints cellulose acetate or similar material with a printing paste comprising the following combination of assistants, namely (1) caprolactam and (2) thiourea.

Caprolactam, as used in this specification, is the inner anhydride of 6-amino-1-caproic acid. In the literature, it is sometimes designated as epsilon-caprolactam (Beilstein, 4th ed., vol XXI, page 240). It occurs in commerce as a dry powder or as a concentrated aqueous solution (about 65%).

I find that when these two reagents are employed in combination in addition to the customary ingredients of a printing paste such as thickening agents and water, printed designs on cellulose ester material are obtained which are much superior to what can be obtained with either agent alone and are greatly in advance of the results of the prior art.

Among the improvements attained by me by the use of this new and superior combination are:

1. Improved strength and brilliance.
2. Improved penetration to the reverse side of the fiber.
3. Improved range of applicable dyestuffs.
4. Complete stability of reagents in the printing paste.
5. The printing paste is neutral and is free of reagents which might be corrosive to equipment or harmless to the operating personnel in case of spills.
6. Stability of the printed design prior to ageing. My new combination is not hygroscopic, and the printed cloth can be stored indefinitely prior to ageing without "flushing" out of the printed area.
7. The printing paste is free of volatile agents, and hence there is no fire hazard due to excess of solvent fumes in the ager or drier. (Some of the practices of the prior art were particularly hazardous from this angle).
8. Acid and direct black colors are printed with particular richness and bloom. (Thiourea, when used by itself, is notably deficient in this respect, as are also many of the other hydrotropic agents suggested in the prior art).
9. Only one printing step is employed. (In some of the prior practices suggested in the art, a swelling agent would be printed on the fabric in a separate operation to act as a dye fixing agent following the regular printing with the color).

The proportions in the printing paste of the two reagents mentioned may vary within wide limits, but I find that optimum results are obtained by using 2 to 6 parts of thiourea and 3 to 7 parts of caprolactam per 100 parts total of printing paste. The proportion of dyestuff may follow standard practice (which generally varies within wide limits according to need and may be, for instance, as low as 0.2% by weight for greys and as high as 6 or 8% for blacks). The customary thickeners may be employed (British gum, starch tragacanth, etc.), and the printing procedure may otherwise follow standard practice, including the customary steaming step, which may be achieved in a period of time ranging from 10 minutes to 1 hour, depending on the type of apparatus selected, and at the customary temperature (212°–220° F.). The printing paste may also contain other optional assistance chosen from among those hitherto employed in the art.

Without limiting my invention, the following examples are given to illustrate my preferred mode of operation. Parts mentioned are by weight.

EXAMPLE 1.—PRINTING COMPOSITION

| | Parts |
|---|---|
| Acid dyestuff—C. I. #289 | 4.0 |
| Thiourea | 2.0 |
| Caprolactam | 3.0 |
| Water | 41.0 |
| Thickener | 50.0 |
| Total | 100.0 |

*Procedure*

The above-described printing paste is printed on acetate process rayon, dried, aged 15 minutes in the rapid ager, rinsed in cold water, then soaped 5 minutes at 120° F., rinsed and dried. A deep, rich navy blue print of excellent brightness and extreme penetration is produced. The resultant print is much stronger and more deeply penetrated than when either assistant is used singly.

EXAMPLE 2.—PRINTING COMPOSITION

|  | Parts |
|---|---|
| Direct dyestuff—C. I. #581 | 4.0 |
| Thiourea | 6.0 |
| Caprolactam | 7.0 |
| Water | 33.0 |
| Thickener | 50.0 |
| Total | 100.0 |

*Procedure*

The above-described printing paste is printed on acetate process rayon, dried, aged 30 minutes in a cottage steamer, rinsed in cold water, soaped 5 minutes at 120° F., rinsed and dried. A rich, bloomy black print is produced of much greater intensity than if either ingredient is used separately.

EXAMPLE 3.—PRINTING COMPOSITION

|  | Parts |
|---|---|
| Acid dyestuff—C. I. #1078 | 4.0 |
| Thiourea | 6.0 |
| Caprolactam | 4.0 |
| Water | 36.0 |
| Thickener | 50.0 |
| Total | 100.0 |

*Procedure*

The above-described printing paste when printed and processed as in Example 2 gives a deep green print of excellent light fastness.

EXAMPLE 4.—PRINTING COMPOSITION

|  | Parts |
|---|---|
| Acid dyestuff—C. I. #1076 | 4.0 |
| Thiourea | 6.0 |
| Caprolactam | 5.0 |
| Water | 35.0 |
| Thickener | 50.0 |
| Total | 100.0 |

*Procedure*

The above-described printing paste may be printed and processed as in Example 2. A strong, bright blue of excellent resistance to "gas-fume" fading is produced.

EXAMPLE 5.—PRINTING COMPOSITION

|  | Parts |
|---|---|
| Acid dyestuff—Pr. #143 | 1.0 |
| Thiourea | 6.0 |
| Caprolactam | 4.0 |
| Water | 39.0 |
| Thickener | 50.0 |
| Total | 100.0 |

*Procedure*

The above-described printing paste when printed and processed as in Example 2 gives a clean, clear grey print of excellent light and wash fastness.

The thickener used in the above examples is the typical thickener used in ordinary printing, such as karaya gum, refined karaya gum, tragacanth, British gum, sodium cellulose glycollate, etc.

Other typical acid and direct dyestuffs which may be used to advantage in this invention are:

Acid dyestuff—C. I. #151
Direct dyestuff—C. I. #420
Direct dyestuff—Pr. #124
Acid dyestuff—C. I. #246
Acid dyestuff—C. I. #307
Acid dyestuff—C. I. #670
Acid dyestuff—C. I. #698
Direct dyestuff—C. I. #539
Direct dyestuff—C. I. #319
Direct dyestuff—C. I. #448

(The C. I. numbers in the above table refer to the well known Colour Index of the Society of Dyers and Colourists. The Pr numbers are Prototype numbers, and refer to the listing in the annual Yearbooks of the American Association of Textile Chemists and Colorists; see for instance the 1944 Yearbook at pages 416–419).

Although the above examples deal particularly with acetate process rayon (cellulose acetate fabric), my improved process may be applied with advantage to other cellulose ester material, such as propionate or butyrate, in the form of woven fabric, yarn, etc.

Numerous other permissible variations and modifications will be readily apparent to those skilled in the art.

I claim as my invention:

1. In the process of printing cellulose esters with a color from the group consisting of acid and direct dyestuffs, the improvement which consists of applying the color by the aid of a printing paste containing as special assistants caprolactam and thiourea.

2. A printing paste for cellulose ester material comprising a thickening agent pasted with water, a dyestuff selected from the group consisting of direct and acid dyestuffs, caprolactam and thiourea.

3. A process for printing cellulose ester fabric, which comprises applying thereto a printing paste as defined in claim 2, and then subjecting the fabric to steaming for a period of time of from 10 minutes to 1 hour.

4. A printing paste for cellulose acetate fabric comprising (1) a thickening agent made into a paste with water, (2) a color selected from the group consisting of direct and acid dyestuffs, (3) caprolactam, and (4) thiourea; the proportion of color being from 0.2 to 6% by weight, the proportion of caprolactam from 3 to 7% by weight, and that of the thiourea from 2 to 6% by weight, all weights being based on the total weight of the paste.

5. A process for printing cellulose acetate fabric which comprises applying thereto a printing paste as defined in claim 4, and then subjecting the fabric to steaming, at a temperature from 212° to 220° F., for a period of time between 10 minutes and 1 hour.

CHARLES FRANKLIN MILLER.

REFERENCES CITED

The following references are of record in the file of this patent:

UNITED STATES PATENTS

| Number | Name | Date |
|---|---|---|
| 2,133,470 | Olpin | Oct. 18, 1938 |
| 2,291,052 | Miller | July 28, 1942 |